M. FLAMMANG,
Assignor to SCOVILL MANUFACTURING COMPANY.
PLATE HOLDER FOR CAMERAS.
No. 9,958. Reissued Dec. 6, 1881.
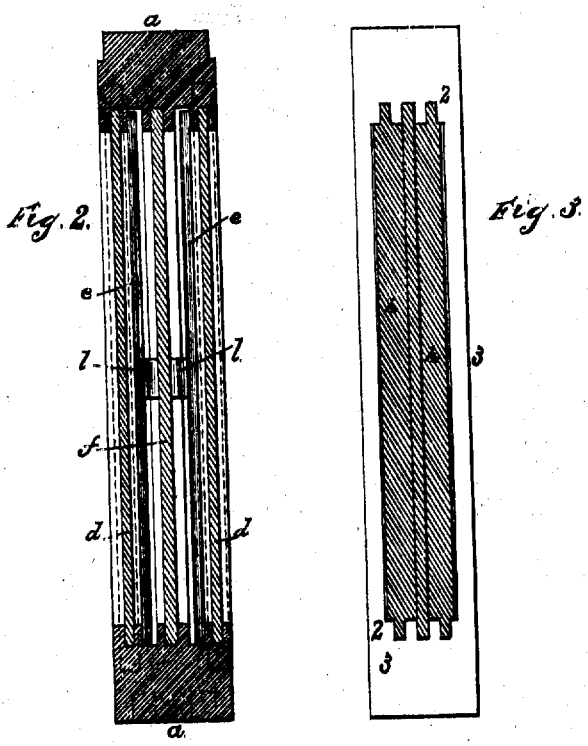
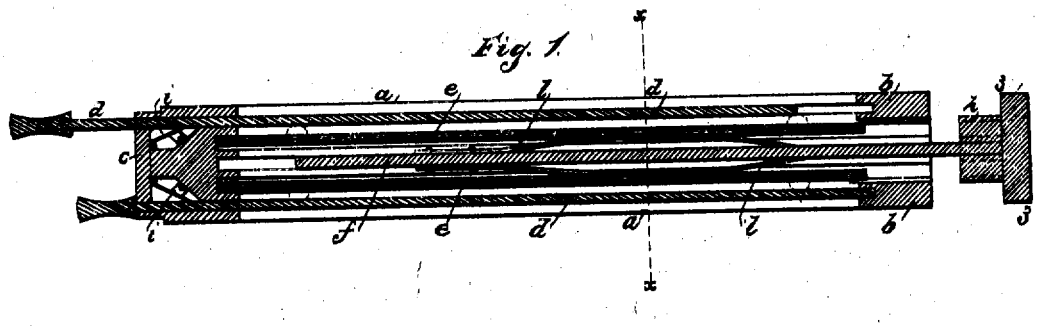
WITNESSES
J. J. Keane
Jas. R. Bowen.
INVENTOR
Mathias Flammang
By his atty.
Edwin H. Brown.

UNITED STATES PATENT OFFICE.

MATHIAS FLAMMANG, OF NEWARK, NEW JERSEY, ASSIGNOR TO SCOVILL MANUFACTURING COMPANY, OF WATERBURY, CONNECTICUT.

PLATE-HOLDER FOR CAMERAS.

SPECIFICATION forming part of Reissued Letters Patent No. 9,958, dated December 6, 1881.

Original No. 238,669, dated March 8, 1881. Application for reissue filed October 6, 1881.

*To all whom it may concern:*

Be it known that I, MATHIAS FLAMMANG, of 154 Summer avenue, Newark, in the county of Essex and State of New Jersey, have invented an Improvement in Plate-Holders for Cameras, of which the following is a specification.

This invention is made for holding two dry plates in one holder, and preventing the access to one plate while operating upon the other.

Plate-holders have been made to contain two dry plates, and a corrugated septum has been introduced between the same; but difficulty is experienced in so shutting off the rays of light that the sensitized plate is not injured.

I make use of a frame that has an opening at one end adapted to receive the two plates or glasses, and a slide or septum separating such plates or glasses, and at the end of the septum is a peculiarly-constructed stopper that excludes light. Slides or sliding covers are provided in the frame outside each plate or glass, and they can be withdrawn at the opposite end of the frame to that which is provided with the opening for the septum and plates or glasses, so that they do not interfere with each other, and the plates or glasses are not liable to become misplaced or the surfaces injured.

In the drawings, Figure 1 is a sectional plan of a plate-holder embodying my improvement, with the septum and one of the slides partially withdrawn. Fig. 2 is a cross-section at the line *x x*, and Fig. 3 is an end view of the plate-holder frame and a section of the septum and stopper.

The plate-holder frame is composed of the side pieces, *a a*, and end pieces, *b b* and *c*. The side pieces, *a a*, have five grooves in the inner faces. The two outer grooves receive the slides *d d*, the next grooves receive the sensitized plates *e e*, usually of glass, and the middle groove receives the septum *f*. The end *c* is slotted for the slides *d d* to pass through, and the swinging cut-offs *i i* are provided, as usual, to prevent the light passing in when the slide *d* is withdrawn. The end pieces, *b b*, connect the side pieces together at the ends of the frame; but they form an opening at one end of the frame, which allows for the introduction freely of the glasses *e e* and the septum *f* from this end. There is a stopper, *h*, at the outer end of the septum, said stopper being of a size and shape to pass in the opening just referred to between the end pieces, *b b*, of the frame, and the ends are notched at 2 2, so as to pass in between the ribs that are made in the inner faces of the side pieces, *a*, of the frame, and there is a flange or cap-piece at 3 to the stopper, which, when the septum and stopper are in place, lies close against the end of the frame. The light is effectually excluded by the stopper and flange of the septum, and the parts set together so closely that the friction prevents the septum sliding out of its place. There are also friction-springs *l l*, that press the glass plates outwardly to their proper places in the plate-holder, and these also serve to increase the friction that holds the septum and its stopper in position at the end of the plate-holder.

By my improvement two dry sensitized plates can be provided in one holder, and after the picture has been taken on one the holder can be reversed and another picture be taken on the second without risk of injury to the photographic negative.

What I claim as my invention, and desire to secure by Letters Patent, is—

1. The combination of a plate-holding frame, a septum adapted to be adjusted in grooves or ways therein, and provided on each side with a spring for bearing against plates or glasses contained within the frame, one on each side of the septum, substantially as specified.

2. The combination of a plate-holding frame and a septum adapted to be adjusted in grooves or ways therein, the same being provided with grooves wherein plates or glasses are held, one on each side of the septum, substantially as specified.

3. The combination of a plate-holding frame, a septum adapted to be adjusted in grooves or ways therein, and grooves wherein plates or glasses may be inserted, one at each side of the septum, substantially as specified.

4. The combination of a plate-holding frame, a septum adapted to be adjusted in grooves or ways therein, and a stopper connected with the septum for excluding light from the said frame, substantially as specified.

5. The combination of a plate-holding frame, a septum, and an opening in the said frame for the insertion of the plates or glasses and the septum, substantially as specified.

6. The combination of a plate-holding frame, a septum, an opening in the said frame, through which plates or glasses and the septum may be inserted, and a stopper connected with the septum, and adapted to close the opening when the septum is inserted in its place within the said frame, substantially as specified.

7. The combination of a plate-holding frame, a septum, an opening at one end of the said frame, through which plates or glasses and the septum may be inserted, and slides adapted to be inserted at the other end of the said frame, one on each side of the septum, substantially as specified.

8. In a photographic-plate-holding frame, the side pieces, *a*, with five grooves in each inner edge, in combination with the two separate slides *d* in the outer grooves, and a septum introduced into the central grooves, and a stopper at the end of the septum to close the opening in the frame, substantially as set forth.

9. The combination, with the central septum, *f*, in a double dry-plate holder, of a stopper at the end of the septum having grooves that fit the ribs upon the inside of the plate-holder frame, and a flange that closes against the end of the plate-holder frame, substantially as set forth.

M. FLAMMANG.

Witnesses:
T. J. KEANE,
JAS. R. BOWEN.